though it may be advantageously used in other arts.
UNITED STATES PATENT OFFICE.

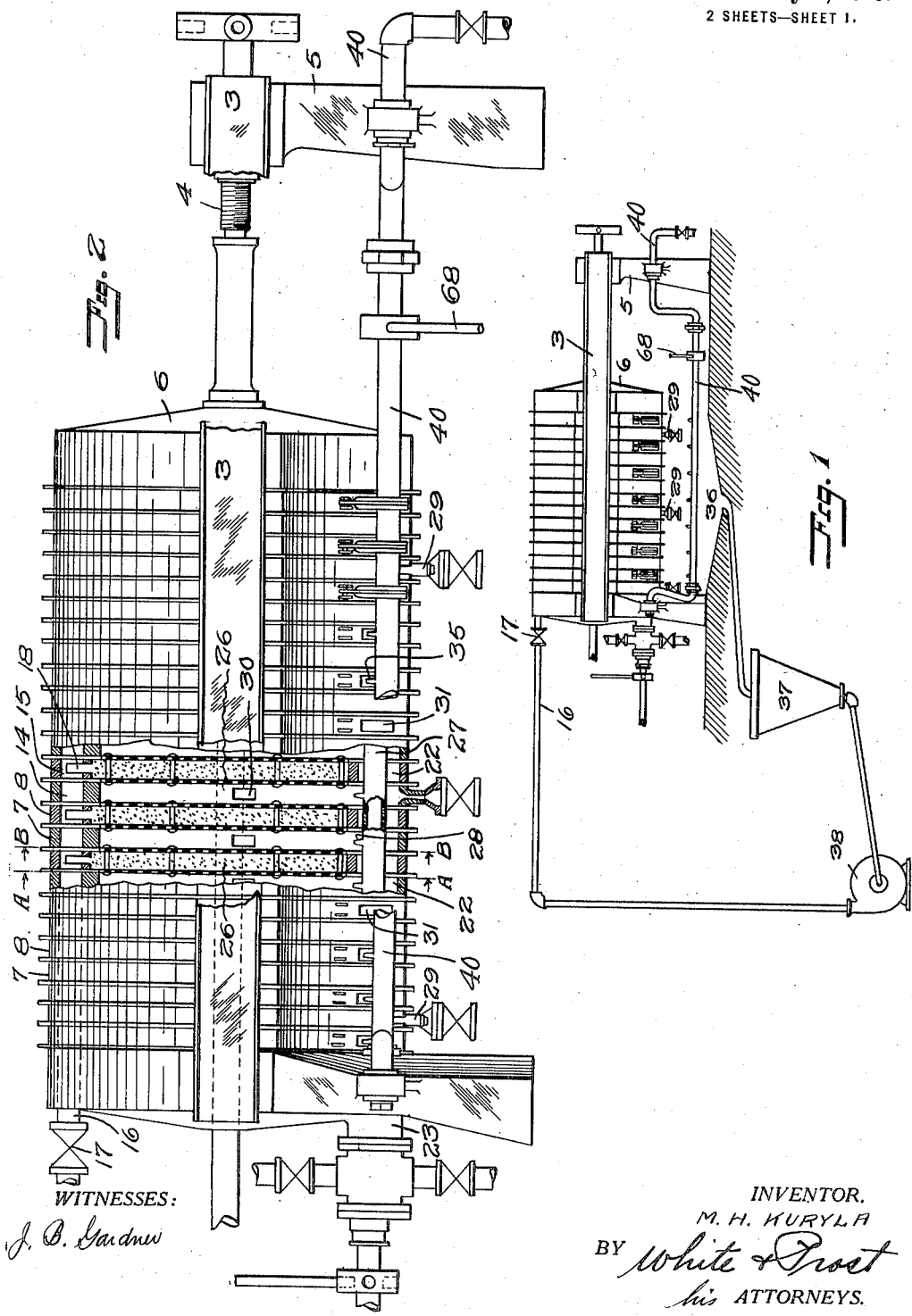

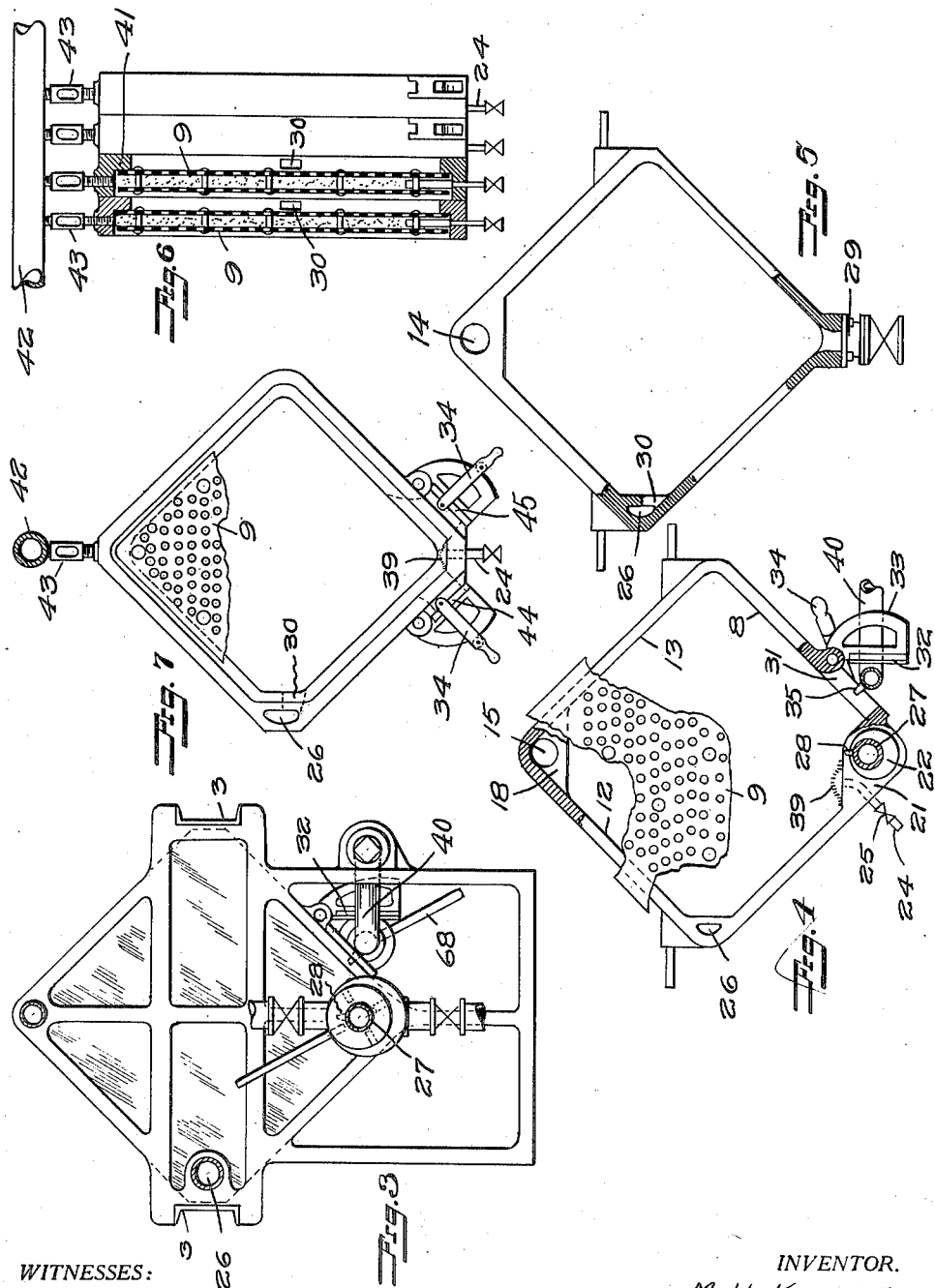

MICHAEL H. KURYLA, OF SAN FRANCISCO, CALIFORNIA, ASSIGNOR TO MERRILL METALLURGICAL COMPANY, OF SAN FRANCISCO, CALIFORNIA, A CORPORATION OF CALIFORNIA.

FILTERING APPARATUS.

1,302,812.  Specification of Letters Patent.  Patented May 6, 1919.

Application filed October 30, 1915. Serial No. 58,789.

*To all whom it may concern:*

Be it known that I, MICHAEL H. KURYLA, a citizen of the United States, and a resident of the city and county of San Francisco, State of California, have invented certain new and useful Filtering Apparatus, of which the following is a specification.

The invention relates to apparatus for filtering or separating solids and semi-solids from liquids or fluids containing the same, and is particularly applicable to metallurgical operations, although it may be advantageously used in other arts.

An object of the invention is to provide a filter having a filtering medium which possesses many advantages over mediums now in general use, particularly in metallurgical filtering operations.

A further object of the invention is to provide means for introducing or removing the filtering medium from the filter without taking down the filter or separating its parts.

A further object of the invention is to provide a filter provided with means whereby both the filtering medium and the solid and semi-solid material deposited during the filtering operation may be removed without separating the parts of the filter.

The invention possesses other advantageous features, some of which, with the foregoing, will be set forth at length in the following description, where I shall outline in full that form of the invention which I have selected for illustration in the drawings accompanying and forming part of the present specification. In said drawings I have shown only one specific form of my generic invention, but it is to be understood that I do not limit myself to such form, because my invention may be embodied in a multiplicity of forms, each being a species of my said invention. It is also to be understood that by the claims succeeding the description of my invention, I desire to cover the invention in whatever form it may be embodied. The present invention is applicable to many forms of filters now on the market, and in the drawings I have shown it as applied to one specific form, but the invention is not limited in its application to the specific form shown.

In accordance with my invention, I employ a mass filtering medium usually consisting of sand or other granular or finely divided or other permeable material firmly packed to form a filtering mass so that it possesses the advantageous features of porous brick, without any of its disadvantages. The mass filtering medium which I prefer to employ is such as to be substantially unaffected by the solution to be filtered. It can withstand cutting and corrosive actions, is not affected by high temperatures or pressures, and its nature can be suited to the properties of the material to be filtered. The fineness of the mass filtering medium may be proportioned to the desired filtration to be performed, and its porosity may be varied while maintaining its uniformity.

Filtering a mixture through a mass filtering medium for any great length of time necessarily results in the deposit throughout the filtering mass of some of the fine or slimy particles of the mixture being filtered, so that the mass becomes clogged and cannot be further used as a filtering medium until it has been cleansed in some way. In some instances filtering mediums have been cleansed by washing them in the filter by a reversed flow of washing fluid or otherwise. Under circumstances encountered in filtering metallurgical and comparable solutions, however, this method in cleansing a mass filtering medium is insufficient and practically impossible and in consequence a mass filtering medium has had a limited use in such processes.

I have devised a filtering apparatus which renders general the use of a mass filtering medium in metallurgical and comparable filtering operations. This apparatus in its preferred form consists essentially in means for removing the fouled packed mass filtering medium from the filter by the impinging action of streams of water or other fluid directed against the packed mass, for cleansing it outside of the filter and then for returning it, evenly distributing and packing it in proper position within the filter. Means for removing the cakes of solid and semi-solid material from the filter, without separating the parts of the filter, are also employed so that it is not necessary to separate the parts of the filter either for removing and replacing the filtering medium or for removing the cakes.

I am aware that the cakes of solid and semi-solid material have heretofore been removed from the containers of filters, without separating the parts of the filter, but the filtering medium has not heretofore been sluiced from the filter plates, so that the removal of the filtering medium did not require the separation of the parts of the filter.

In cyanid practice, in which the ground ore is mixed with cyanid solution to accomplish the solution of the valuable metal particles and the mass then filtered to separate the liquid from the solid portion, sand may be employed as the mass filtering medium.

The present filter may also be employed efficiently in the process of aluminum manufacture. The hot sodium aluminate liquor is extremely deleterious to the fabric filtering mediums heretofore used, whereas the present filter may be charged with a mass filtering medium which is not affected by the hot caustic liquor. Similarly, there are other industries where hot solutions or caustic, acid or corrosive chemicals are used or generated during the process which would weaken or destroy the usual filtering medium and which the use of this filter will obviate.

In the accompanying drawings:

Figure 1 is an elevation of one form of filter, showing means for removing, washing and reintroducing the mass filtering material.

Fig. 2 is a side view of the filter partly in section, showing means for sluicing both the mass filtering medium and the cakes of unfilterable material from the filter.

Fig. 3 is an end view of the filter shown in Fig. 2.

Fig. 4 is an end view of a filtering medium frame taken on the line A—A Fig. 2, the foraminated plate which retains the filtering medium in the frame being partly broken away and parts of the frame being broken away.

Fig. 5 is an end view of one of the container frames, taken on the line B—B Fig. 2.

Fig. 6 is a side view partly in section of a modified form of filter in which the filtering medium and container frame are formed integral.

Fig. 7 is an end view of the filter frames shown in Fig. 6, part of the perforated plate being broken away.

The filter may be any desirable construction of either the pressure, the vacuum or the gravity types to accomplish the ends sought by this invention and the filtrate may pass completely through the mass filtering material frame and be discharged from the further side thereof, or it may pass into and through the mass filtering material in the manner shown in the embodiment illustrated in the drawings.

By providing means for readily removing or introducing the filtering medium without taking apart or separating the various parts of the filter, many possibilities in the filter construction and operation are presented which I desire to cover in the succeeding claims. Heretofore, it has been necessary to dismember the filter, or at least separate some of the parts when new filter cloths were required and when the solution being filtered was of such nature that it produced a very deleterious action on the filter cloths, it was necessary to dismember the filter or parts thereof very often, a process which is expensive both in time and material. With the use of the present filtering medium, the injurious effect of the solutions on fabric filtering medium may be entirely overcome, and it is necessary to remove and clean the mass medium only when it becomes clogged with fine particles or otherwise exhausted. The removal of the medium from the filter, its thorough cleaning and its re-introduction into the filter is accomplished rapidly and efficiently and without the dismemberment of the filter or parts thereof.

It is understood that in metallurgical and comparable filters, the mixture of fluid and solid or semi-solid materials is introduced into a chamber containing a filtering medium, that the fluid portion of the mixture passes through the filtering medium and that the solid or semi-solid material builds up in the form of a cake on the surface of the filtering medium. This cake has been removed from the filter plate or filter medium in many ways and when the container for the mixture of fluid and solids and semi-solids is a closed chamber, the cake has been removed from the chamber in many ways, both with and without the dismemberment of the filter or the separation of some of its parts. In the present drawings, I have shown the invention as applied to a pressure filter, in which the chamber or chambers into which the material to be filtered is fed are closed chambers and in which pressure is produced for forcing the fluid through the filter medium or filter frame, but filtration may be accomplished by a difference in pressure produced in any desirable manner, such as by reducing the pressure on the filtrate effluent side of the filter.

The filter press shown in Figs. 2 and 3 comprises a suitable frame, consisting in part of the side rails or channels 3 upon which separate units of the press are mounted. The units are pressed tightly together by means of the screw 4 bearing in the standard 5 and pressing against the end plate 6. The press comprises a plurality of units of different construction alternately arranged, the units 7 constituting the container frames and the units 8 constituting the granular material or mass filtering medium frames. The container frame 7 comprises preferably a rectangular structure entirely open on its interior for the reception of the material to be filtered. The mass filtering medium frame 8 comprises a similarly shaped structure having screens or foraminous partitions 9 or other filtering medium retaining means arranged at the opposite sides thereof. These foraminous partitions are preferably held in place on the frames by rivets passing through both plates or partitions and holding them against the frame. The frames 8 are filled with filtering medium and the holes in the foraminous plates are of such size that the packed mass filtering medium is retained in the frames forming filter plates or filter leaves.

Means are provided for filling the frames 8 with filtering medium which packs in the frame to produce a mass filtering medium, for removing the medium from the frame, for introducing the mixture to be filtered into the container frames, for discharging the filtered liquid and for removing the cake of solid or semi-solid material from the container frames, all without separating the various units of the filter. The frames, which when filled with mass filtering medium become the equivalent of filter plates or leaves, are preferably arranged so that when the filtering medium is introduced into the frame 8 it flows to all portions of the frame and completely packs the space therein. For this reason the frame is arranged so that an angle or apex of the frame lies above the level of the rest of the frame, or in other words, the sides of the frame are inclined to the horizontal. The filtering medium is introduced at the upper apex or angle of the frame, and on account of the slope of the upper side walls 12—13 of the frame, the medium may flow to all parts of the frame, thereby obviating any large or material voids. In the construction shown in Figs. 2 to 5 inclusive, each frame 7 and 8 is provided with an opening 14—15 respectively extending therethrough, which, when a series of frames are put together in a filter press, makes a continuous channel or passage extending for the length of the press. This passage is preferably closed at one end and is connected at the other end to a conductor or pipe 16 provided with a valve 17. Passing through the wall of the frame 8 is a passage 18, which connects the channel formed by the alined openings 14—15 with the interior of the frame. When it is desirable to fill the frames 8, a mixture of filtering medium and fluid (air, gas or liquid) is flowed into the channel from the pipe 16, whence it flows into the frame 8, the medium completely filling and packing tightly in the frames. The fluid flows through the foraminous plates 9 into the frames 7, whence it is discharged from the press through the valve controlled outlets 29. When the frames have become packed with the mass filtering medium the valve 17 is closed. That portion of the container frame 7 lying below the opening 14 is preferably thicker than that portion of the frame 8 lying below the opening 15, so that the interior of the frame 8 extends to a higher level than the interior of the container frame. This difference in height of the interior of the frames allows the mass filtering medium in the frame to shrink and settle without falling below the level of the liquid in the container frame, and thereby prevents the entry of the material to be filtered into the frame 8 above the filtering mass therein.

At its lower corner or apex the frame 8 is provided with a thickened portion 21 through which extends an opening 22, through which all of the container frames 7 are interconnected when the filter is assembled. The material to be filtered is introduced into the container frames through the conductor 23 which is alined with the openings 22 in the frames 8. The filterable material passes through the filtering medium and discharges from the filter frames, in the present instance, through the conductors 24 arranged adjacent the bottom of the frames, which conductors are provided with valves 25. A screen 39 placed over the inlet end of conductor 24 prevents the filtering medium from discharging with the filtrate. Formed in the side corner of each frame is an opening 26, and when a plurality of frames are assembled in a filter press, these openings form a continuous passage extending for the length of the filter. Each container frame is provided with a passage 30 connecting the interior of the frame with the passage formed by the alined openings 26, and after the cakes of solid and semi-solid material have been forced in the containers, wash water or solution is introduced into the containers through these passages, for the purpose of removing any valuable liquid remaining in the cake. The liquid for washing the cake may be introduced through any of the other channels which communicate with the container frames.

The illustrated means employed for removing the cakes from the container frames comprises a pipe 27 disposed in the passage formed by the openings 22 and provided with nozzles 28 directed toward the interior of the container frames. Water or other liquids, fluid or gas or mixtures of the same, is forced through the pipe and nozzles against the cake and the cake is cut away by the impinging action of the jets and sluiced out. The pipe 27 is arranged to rotate so that the streams discharging from the nozzles may be directed against all parts of the cake, and the dislodged cake passes through the passage formed by the openings 22 and discharges through the valved conduits 29.

Means are provided for sluicing the mass filtering medium from the frames when the medium becomes clogged or fouled or otherwise affected, to such an extent that renewal or thorough cleaning thereof is advisable. The mass filtering medium may be cleaned after each cycle of cake making or it may be cleaned after a plurality of cycles of cake making, that is, the filtering medium may be cleaned after each cake is formed, or several cakes may be formed and removed before the filtering medium is cleaned. Each frame 8 is provided at its lower end with an aperture 31 which is normally closed by a gate 32. The gate is preferably provided with a cam 33 on its rear, which is engaged by a lever 34 for holding it in the closed position, and for rapidly opening it. One lever may serve to operate all of the gates at the same time. Means are provided for directing streams of liquid, vapor or gas under pressure through the apertures and against the packed filter mass. Arranged adjacent the gates and preferably rotatably mounted is a pipe 40 provided with nozzles 35 arranged to discharge streams through the apertures 31 and against the packed filter mass. The impinging action of the jets of liquid striking the packed mass from below, causes the disintegration of the mass and the sluicing of the material from the filter. The pipe is also mounted so that it may be swung out of the way of the gates when the gates are to be closed and adjacent to the apertures when the gates are opened, and so that it may be moved during the sluicing operation to direct the streams toward the various parts of the interior of the frame. The portion of the pipe which carries the nozzle is rotatably connected to the remainder of the pipe, which is capable of being swung, so the nozzled portion of the pipe has a motion of rotation and translation and the pipe may be rotated by any suitable means as the handle 68.

The discharged filtering medium may be cleaned and conducted back to the frame in many ways, and in Fig. 1, I have shown one form of such means. The filtering medium and water discharges through the apertures 31 and falls into the pit or conduit 36, whence it flows to a hydraulic classifier 37 in which an upwardly directed current carries off the fouled matter which has accumulated in the medium. The cleansed medium settles to the bottom of the classifier, whence it is pumped back into the frames 8 by the pump 38. It is apparent that other means may be employed for separating the accumulated particles from the medium, such as classifiers, washers, beaters or screens.

In Figs. 6 and 7 I have shown a modified form of construction in which the filter medium frames and the container frame are formed integral, the frame being provided with a shoulder 41 at that part which constitutes the container to provide a seat for the foraminous partition and to provide for shrinkage and packing of the same, as has been heretofore explained. The filter medium charging means consists of a separate pipe 42, which is connected to the filter medium chambers by pipes provided with sight feeds 43. In this construction, each frame is provided with two gates 44—45, one closing an opening to the filter medium chamber and the other closing an opening to the cake chamber, and the medium and cake are sluiced out, as has been heretofore described.

I claim:

1. In a filter, a frame having a foraminous side and a filling of mass filtering material, said frame being provided with a filtering material outlet at its lower portion, a gate normally closing said outlet, and means arranged adjacent said outlet for directing a stream of fluid under pressure upwardly through said outlet when the gate is open and against the material in the frame.

2. In a filter, a plurality of spaced frames adapted to contain mass filtering material, and means for simultaneously charging the material into said plurality of frames.

3. In a filter, a plurality of spaced frames adapted to contain mass filtering material and a common conduit for charging the material into said frames.

4. In a filter, a plurality of spaced foraminous frames adapted to contain mass filtering material and sluicing apparatus for simultaneously charging the material into said plurality of frames.

5. In a filter, a plurality of spaced frames adapted to contain mass filtering material, means for simultaneously charging the filtering material into said plurality of frames, and means for simultaneously removing the filtering material from said plurality of frames.

6. In a filter, a plurality of spaced frames adapted to contain mass filtering material, means for simultaneously charging the material into said plurality of frames, and means for simultaneously sluicing the material from said plurality of frames.

7. In a filter, a plurality of separate contiguous frames of alternate construction, the frames of one construction containing a mass filtering medium and the frames of the other construction being adapted to receive the material to be filtered and to retain the unfilterable component thereof, means for sluicing the unfilterable component from its containing frames and separate means for sluicing the mass filtering medium from its containing frames all without separating said frames.

In testimony whereof, I have hereunto set my hand at San Francisco, California, this 23rd day of October, 1915.

MICHAEL H. KURYLA.

In presence of—
H. G. PROST.